United States Patent [19]

Hicks

[11] Patent Number: 5,404,197
[45] Date of Patent: Apr. 4, 1995

[54] AUTOMATED PHOTOGRAPHIC NEGATIVE CARD HANDLER

[76] Inventor: Ray Hicks, 2605 Corunna Rd., Flint, Mich. 48503

[21] Appl. No.: 248,344

[22] Filed: May 24, 1994

Related U.S. Application Data

[63] Continuation of Ser. No. 17,414, Feb. 5, 1993, Pat. No. 5,315,348, which is a continuation of Ser. No. 815,710, Dec. 31, 1991, abandoned.

[51] Int. Cl.$^6$ .................. G03B 27/32; G03B 27/48; G03B 27/50
[52] U.S. Cl. .................. 355/77; 355/50; 355/64
[58] Field of Search .................. 355/50, 64, 76, 77; 271/93, 107, 194, 279

[56] References Cited

U.S. PATENT DOCUMENTS

| 2,198,169 | 4/1940 | Kallush . | |
| 2,251,184 | 7/1941 | Bohannon . | |
| 2,741,960 | 4/1956 | Oldenbloom . | |
| 2,849,916 | 9/1958 | Nolan . | |
| 2,999,686 | 9/1961 | Cheeseman et al. | 271/11 |
| 3,146,902 | 9/1964 | Voelker | 214/307 |
| 3,391,926 | 7/1968 | Jaatinen | 271/27 |
| 3,588,243 | 6/1971 | Osawa et al. | 355/64 X |
| 3,625,377 | 12/1971 | Bohannon et al. | 214/8.5 |
| 3,669,537 | 6/1972 | Kobayashi | 355/50 |
| 3,879,031 | 4/1975 | Melehan | 271/11 |
| 3,931,964 | 1/1976 | Schwebel | 271/93 |
| 3,966,318 | 6/1976 | Amort | 355/64 |
| 3,984,099 | 10/1976 | McCrea | 271/276 |
| 4,181,428 | 1/1980 | Proulx | 355/75 |
| 4,371,158 | 2/1983 | Marx et al. | 271/93 |
| 4,392,766 | 7/1983 | Blunt | 271/107 |
| 4,438,916 | 3/1984 | Kawaguchi | 271/93 |
| 4,441,807 | 4/1984 | Bartz | 355/40 |
| 4,443,099 | 4/1984 | Linman et al. | 355/75 |
| 4,494,862 | 1/1985 | Tanaka | 355/40 |
| 4,551,012 | 11/1985 | Schaut et al. | 355/50 |
| 5,064,184 | 11/1991 | Liepert | 271/93 |
| 5,315,348 | 5/1994 | Hicks | 355/50 |

FOREIGN PATENT DOCUMENTS 2707040 10/1977 Germany .................. 271/93

Primary Examiner—Richard A. Wintercorn

[57] ABSTRACT

The present invention provides an improved device for transporting photographic negatives mounted on carrying cards to the optical stage of a photographic printer. A storage bin houses a plurality of the carrying cards prior to being transported to the optical stage of the printer. A first vacuum member releasably engages one of the carrying cards and transports that carrying card to a predetermined intermediate location. A second vacuum member operates to transport the carrying card between the intermediate position and the optical stage of the photographic printer. A third vacuum member operates to transport the carrying card from the predetermined intermediate position to a discharge bin. A secondary carrying card transport assembly is adapted to transport at least one carrying card having a secondary photographic negative mounted thereon to the same predetermined location to simultaneously transport multiple negatives to the optical stage of the printer.

9 Claims, 5 Drawing Sheets

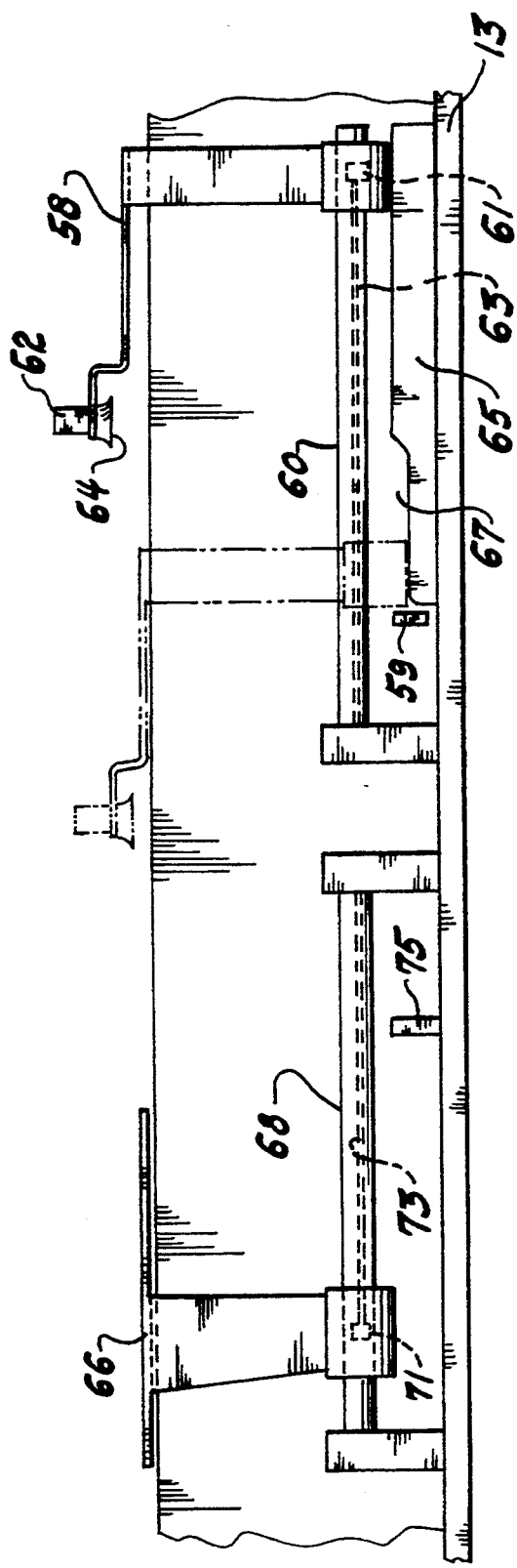

AUTOMATED PHOTOGRAPHIC NEGATIVE CARD HANDLER

This application is a continuation of application Ser. No. 08/017,414, filed Feb. 5, 1993, now U.S. Pat. No. 5,315,348, which is a File-Wrapper-Continuation of application Ser. No. 07/815,710, filed Dec. 31, 1991 (now abandoned).

FIELD OF THE INVENTION

The present invention relates to an apparatus for handling photographic negatives in a commercial photographic environment and, more particularly, to an apparatus for transporting negatives mounted on carrying cards to the optical stage of a photographic printer.

DESCRIPTION OF THE PRIOR ART

At one end of the photographic processing spectrum is the amateur photographer. Typically, the amateur photographer utilizes a single roll of film, sized for perhaps 12 to 36 exposures, to take a small number of photographs of various objects or persons, usually well known to the photographer. The film is then presented to a commercial processing outlet for developing and printing. Alternatively, the photographic enthusiast processes the photographic film in his own developing facilities at home. In either case, the photographer typically can identify the subject of each finished photographic print. Such individuals tend to be forgiving of the composition and color deficiencies of their home photography and usually require only a single uniformly sized print of each exposure.

The mass commercial application of the photographic process is on the extreme opposite end of the spectrum. These mass processing commercial endeavors typically involve exposing individual photographs of the members of a large organization, such as an entire grammar school or high school population, an athletic team, or the employees of a large corporation. Thus, a single commercial photographer may photograph several hundred subjects as part of a single project.

In mass commercial photographic settings, each individual subject generally expects to be offered a variety of format choices for his final purchase. Using the typical grammar school pictures as an example, the parent of the student being photographed may be offered the opportunity to purchase a single 8"×10" copy of the photograph, a combination of one 8"×10" and two 5"×7" photographs, or perhaps a collection of one large photograph and several wallet sized photographs. The necessity of offering to the customer a choice creates significant problems of matching a particular subject with that subject's actual photographic order at the time the photographic negatives are turned into prints. These problems are compounded by the fact that the photographer, and others involved in the commercial process, are not able to visually recognize the subjects of the various exposures. Thus, this commercial photography task is subject to substantial error, largely as a result of mistakes made by the human operators in the processing chain. Customer A, for example, orders a single 8"×10" glossy, and receives two 5"×7"'s instead, while customer B receives customer A's order.

A second significant problem with processing commercial photographs is the control of the overall quality of the colors and hues of the photographic images. Typically, a commercial photographer will take into consideration the color of the background against which the subject is photographed, the tone of the subject's skin, as well as the color of the subject's eyes, hair and clothing while taking the photograph. This information is also helpful to obtain a true and accurate reproduction of the subject's appearance when developing the photograph. To utilize this information, it must be correlated to the specific exposure and utilized during the subsequent developing and printing processes.

Commercial photographers typically expose several hundred individual frames of subjects on a single roll. This film is then developed on an assembly line basis as an entire continuous roll, and placed in a commercial production printing machine. The printing machine projects the film's images onto a viewing screen and the operator manually correlates written information about the subject and his or her order with the exposed frames. The operator selects the appropriate exposure and color selections for the subject, confirms the type of order which the subject has placed for prints, and manually enters the order information into the printer control memory via a keyboard. Once the decisions regarding the order and color balance have been made by the operator, the printing machine automatically exposes the photographic paper from the film in the number and sequence of photographs called for in the order, so as to produce a continuous roll of photographic paper containing hundreds of latent images. The exposed photographic paper is then presented for darkroom processing in an automated fashion. As a final step, the developed photographs are separated by a cutter, again based on a manual correlation of the order information with a visual examination of the print.

Although the above process operates satisfactorily, it is fraught with potential for operator error. To avoid these difficulties, commercial photographic laboratories have generally followed one of two basic methods. In the first method, a card containing identifying and order information is prepared for each subject, and photographed along with the subject. In order for this method to work properly, the information must be written clearly on the identifying card, and in extremely high contrast ink. The actual imaged on the negative is quite small, and the characters in the negative image are usually less than one inch high on a very low contrast background. Also, if the card is improperly positioned, some of the data on it may be unreadable. In an alternate method, an identifier unit is placed in the camera, which contains automated visual images which are projected onto the film, as an improvement over the manually held card. However, if the identifier mechanism fails to function, the order for the subject will be lost. In the event of a failure of the film advance or a double exposure, the data may be unreadable or superimposed on another photograph. Lastly, the photographer must remember to change the identification card and order code for each subject.

In a second method, the film is cut into individual negative image transparencies and are secured to masking or carrying cards having an aperture therein. The negative image is mounted within the aperture so that prints may be exposed from the film without being removed from the card. In this method, the carrying card operates to protect the negative film during handling, and further provides the base for storing identifying, order, color correction, or other information about the film image mounted thereon. Thus, the order, color correction, or other information is physically secured to the corresponding negative image so as to eliminate the possibility of improper sequencing of images with respect to such data. An example of such a carrying card is disclosed in U.S. Pat. No. 4,441,807 for a "photographic printing system including an improved masking card".

These carrying cards at least partially eliminate the problem of correlating exposure and order information to the negatives; however, the cards produce new problems with respect to handling and manipulating the photographic film during the various stages of processing. Since the film is no longer in a single convenient strip which may be sequentially drawn through a photographic printer, the carrying cards must be individually inserted and removed from the printer optical stage. This handling task dictates new methods for negative storage, sorting, and movement so that individual cards are not misplaced or misaligned.

An example of a photographic printing station system adapted to process film secured to carrying cards can be found in U.S. Pat. No. 4,443,099. This patent discloses a photographic printer utilizing a linear series of drive belts to deliver individual carrying cards to the optical stage of the printer. A vacuum plate removes an individual card from a first receptacle and delivers it to a drive belt system for subsequent delivery to the optical stage of the printer for processing. The disclosed system may operate effectively as an entire unit, but is not easily adaptable to be used with existing photographic printers, since it requires a relatively linear array of components. These components are not easily positioned linearly within the typically limited space available on existing printers.

Therefore, there is a need in the industry to provide a convenient, automated, and efficient method of transporting carrying cards to the optical stage of existing photographic printers.

SUMMARY OF THE INVENTION

The present invention provides an improved, readily detachable, device for transporting photographic negatives mounted on carrying cards to and from the optical stage of a commercial photographic printer. A storage bin houses a plurality of carrying cards for transport to the optical stage of the printer. A first vacuum member releasably engages one of the carrying cards in the storage bin and transports it to a predetermined intermediate location. A second vacuum member releasably engages the carrying card supported by the first vacuum member at the predetermined intermediate location and thereafter transports the carrying card to the optical stage of the photographic printer. Such a transfer of cards eliminates the need to change directions which often causes misalignment of the cards.

More specifically, the storage bin holds the carrying cards at or below the level of the optical stage of the printer. The first vacuum member is positioned above the storage bin and is vertically moveable. The first vacuum member includes a removable brace member and a pair of spaced, substantially horizontally extending vacuum arms. A pair of substantially vertically extending track sections are disposed so as to allow the brace member to slideably engage the track sections for vertical movement thereof. A pneumatic actuator moves the brace member along these track sections. The pair of spaced, substantially horizontally extending vacuum arms extend over the storage bin so as to be lowered into and removed from the storage bin as the first vacuum member is moved along the track sections. The pair of spaced, substantially horizontally extending vacuum arms removeably engage the topmost carrying card when it is lowered in the storage bin. Thus, the first vacuum member transports the carrying cards from the storage bin to a predetermined intermediate location above the storage bin at or slightly above the level of the optical stage of the printer and supports them at that position for further handling.

Preferably, the second vacuum member moves substantially horizontally between the predetermined intermediate position and the optical stage. The second vacuum member includes a pair of spaced, substantially horizontally extending vacuum arms secured to a moveable brace member so as to extend generally toward the storage bin in a plane at or slightly above the level of the optical stage of the printer. The brace member slideably engages a pair of substantially horizontally extending track sections positioned between the optical stage and the intermediate position. A pneumatic actuator controls the movement of the brace member along the track sections. In this manner, the second vacuum member is adapted to move between the optical stage of the printer and the position at which the first vacuum arm supports individual cards. Further, the vacuum arms are adapted to removeably engage the carrying cards and transport them along this path to and from the optical stage of the printer.

In the preferred embodiment, the pair of substantially horizontally extending track sections, associated with the second vacuum member, are mounted on a rotatable base which operates to allow the pair of substantially horizontally extending track sections to rotate in a substantially horizontal plane about the optical stage. In this manner, the device may rotate a carrying card at the optical stage about the optical center-line of the printer to rotate the negative between "landscape" and "portrait" orientations.

In a further preferred embodiment, the device further includes a discharge bin operative to store a plurality of carrying cards. A third vacuum member releasably engages a carrying card disposed at the predetermined intermediate location and transports it from the predetermined intermediate position to the discharge bin. Typically, the third vacuum member would engage a carrying card supported by the second vacuum member at the outer extent of the path of movement of the second vacuum member, i.e., the intermediate position point common to the paths of both the first and second vacuum members.

Preferably, the discharge bin and storage bin are disposed at similar elevations and the third vacuum member is substantially horizontally moveable thereabove so as to transport carrying cards therebetween. Cards are deposited in the discharge bin by eliminating the vacuum support of the third member when the card is above the discharge bin. In further embodiments, the bins may be individually or integrally detachable to allow for convenient loading and unloading during operation of the photographic printer.

In another embodiment the present invention includes a secondary carrying card transport assembly adapted to transport at least one carrying card having a secondary photographic negative mounted thereon to the same predetermined intermediate location. The second vacuum member is adapted to releasably engage any carrying card disposed at the predetermined intermediate location, such as by the first vacuum member or the secondary carrying card transport assembly. In this manner, multiple carrying cards from different locations may be transported to the optical stage and simultaneously exposed by the printer.

BRIEF DESCRIPTION OF THE DRAWINGS

These and other objects and aspects of the invention will become apparent in the detailed description of the invention hereinafter with respect to the drawings in which:

FIG. 5 is a simplified rear view of the invention device showing the control mechanisms for the secondary card assembly and third vacuum member.

DETAILED DESCRIPTION OF THE PREFERRED EMBODIMENT

The present invention provides an efficient means for serially transporting photographic negatives, mounted on carrying cards, to and from the optical stage of a photographic printer. Further, the present invention is directed at providing the means for transporting carrying cards in a convenient, automated manner so as enable automated commercial processing thereof.

Figure 1:
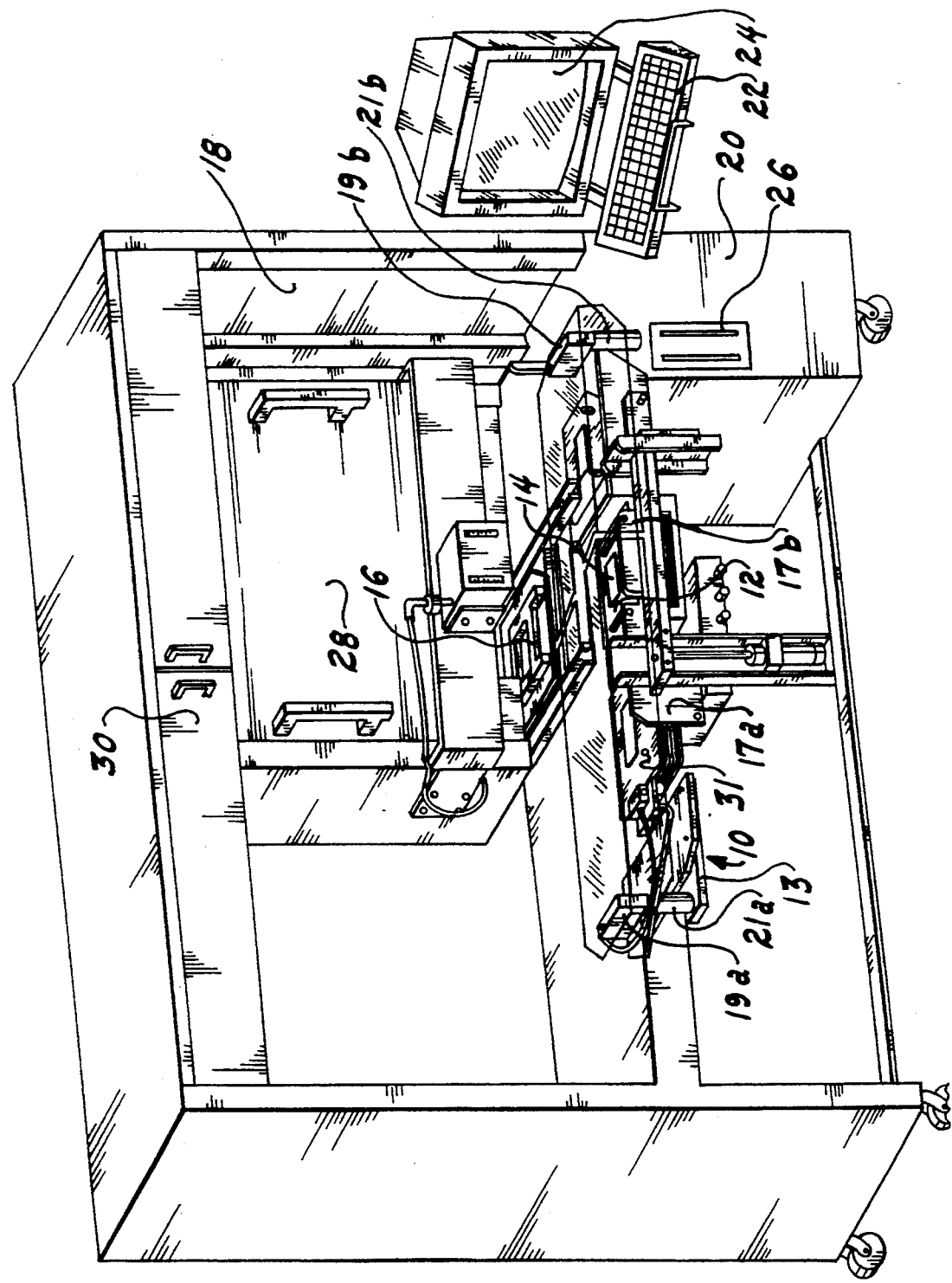
FIG. 1 is a perspective view of photographic printer having the invention device disposed thereon.
Figure 2:
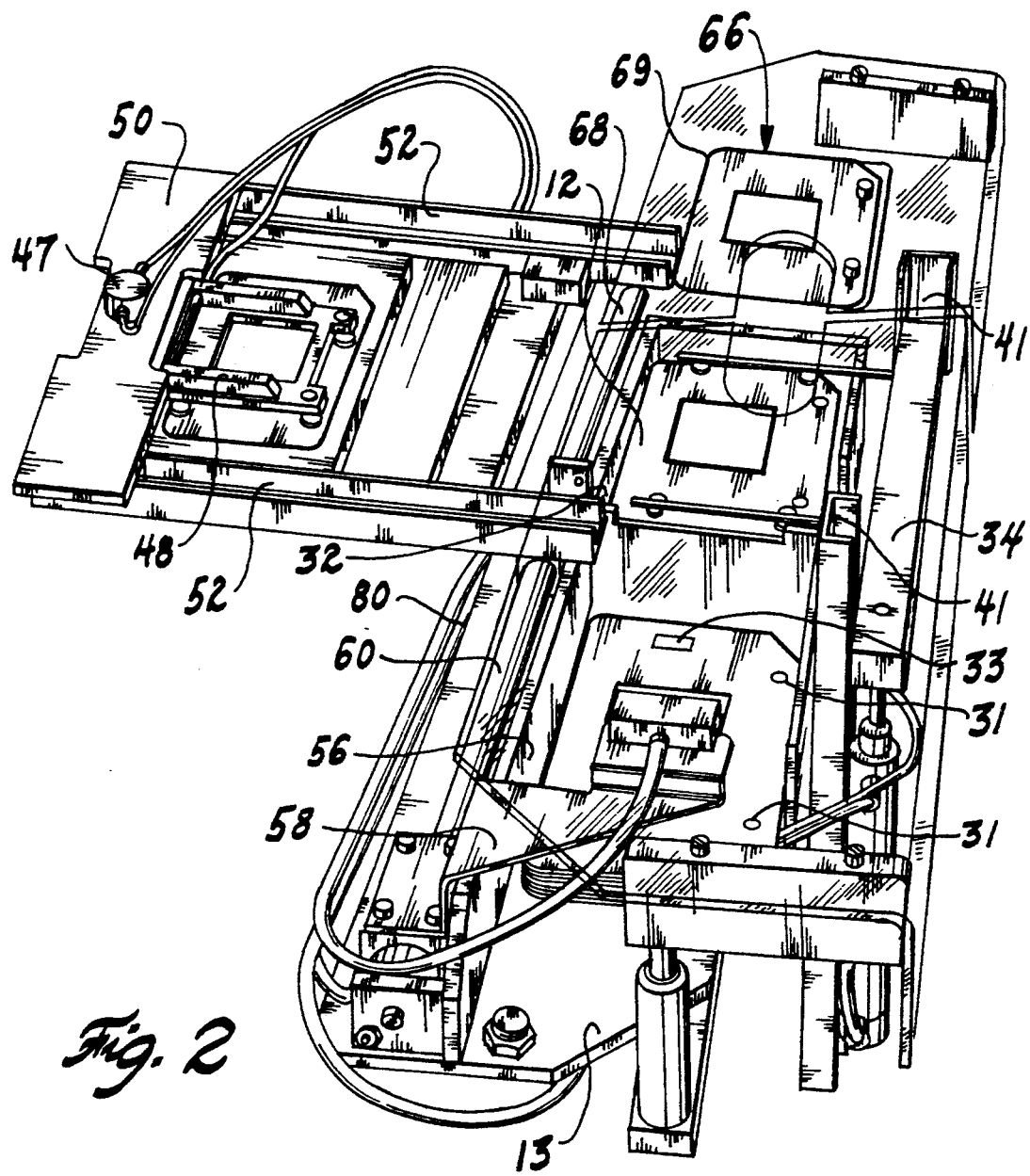
FIG. 2 is a perspective end view of the invention device.

With reference to FIGS. 1 and 2 the present invention provides an auxiliary device 10 to transport carrying cards 12, having photographic negatives 14 mounted thereon, to the optical stage 16 of a photographic printer 18. The printer 18 is typically configured as a desk-type unit which allows an operator to sit conveniently proximate the printer controls. The printer 18 has a computer control system 20 comprising a keyboard 22, video display 24, and various input means, such as disk drives 26. The printer 18 operates to expose photographic images of the negatives 14 at the optical stage 16 through a lens deck 28 onto photographic paper located within an overhead housing 30. The present invention conveniently attaches to and quickly interfaces with the existing control systems for a standard printer 18 so as to feed carrying cards to the optical stage 16.

Generally, the present device 10 comprises a trio of bins: a storage bin 32, a discharge bin 56, and a secondary bin 69, arranged linearly adjacent one another and secured to the printer somewhat below the plane of the optical stage on a base plate 13. The device 10 is attached to the printer by suitable fasteners (not shown) attached proximate the rear edge 80 of base plate 13 to provide a secure and readily detachable connection. These bins may further be separately or integrally detachable to allow for convenient loading and unloading of carrying cards 12 during the operation of the printer. Suitable mechanisms are provided to transport carrying cards 12 between these bins and an intermediate position. A separate mechanism transports the carrying card between the optical stage of the printer and that intermediate position.

Figure 3:
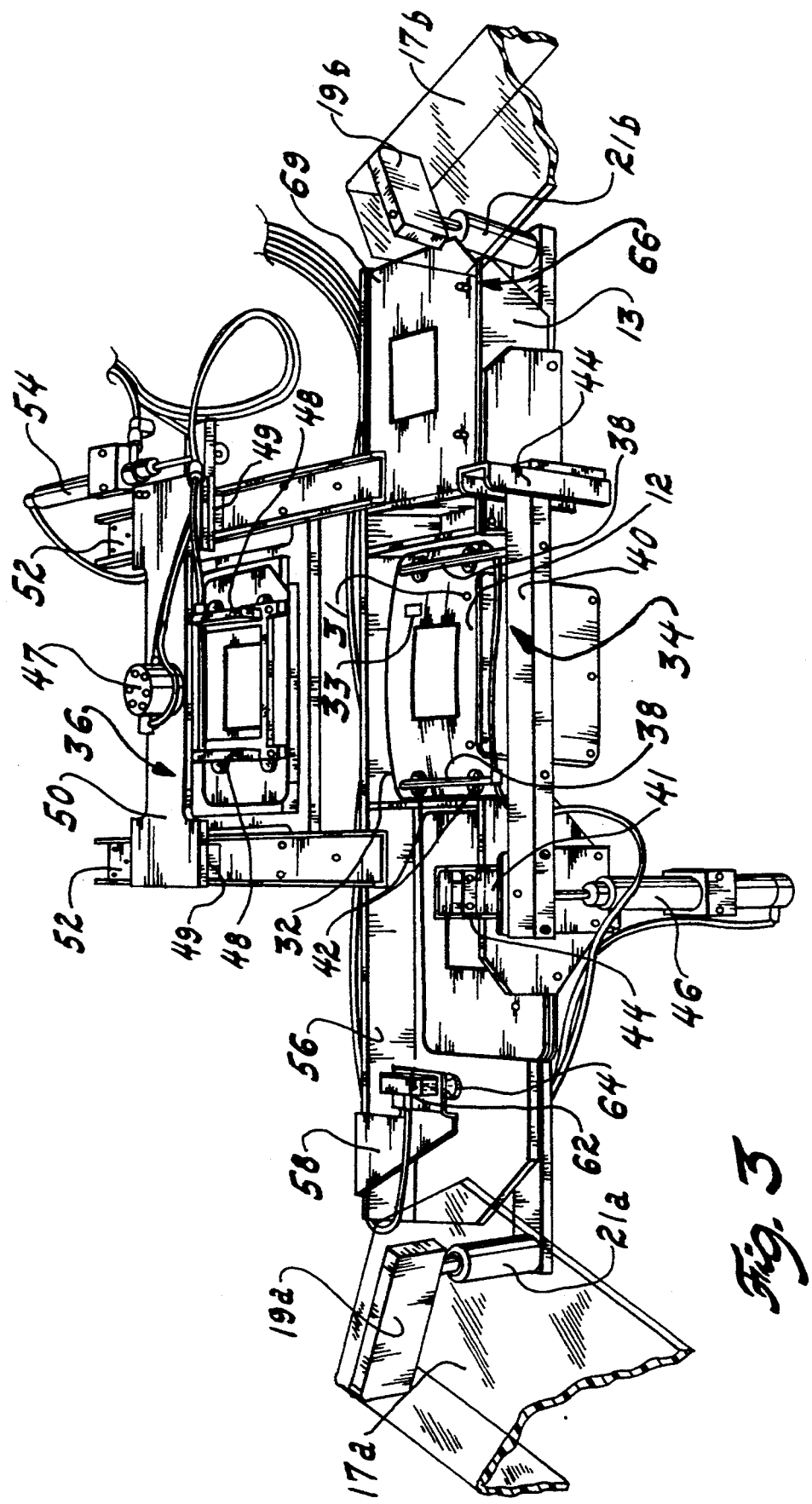
FIG. 3 is a perspective front view of the invention device showing the second vacuum member disposed proximate the optical stage.
Figure 4:
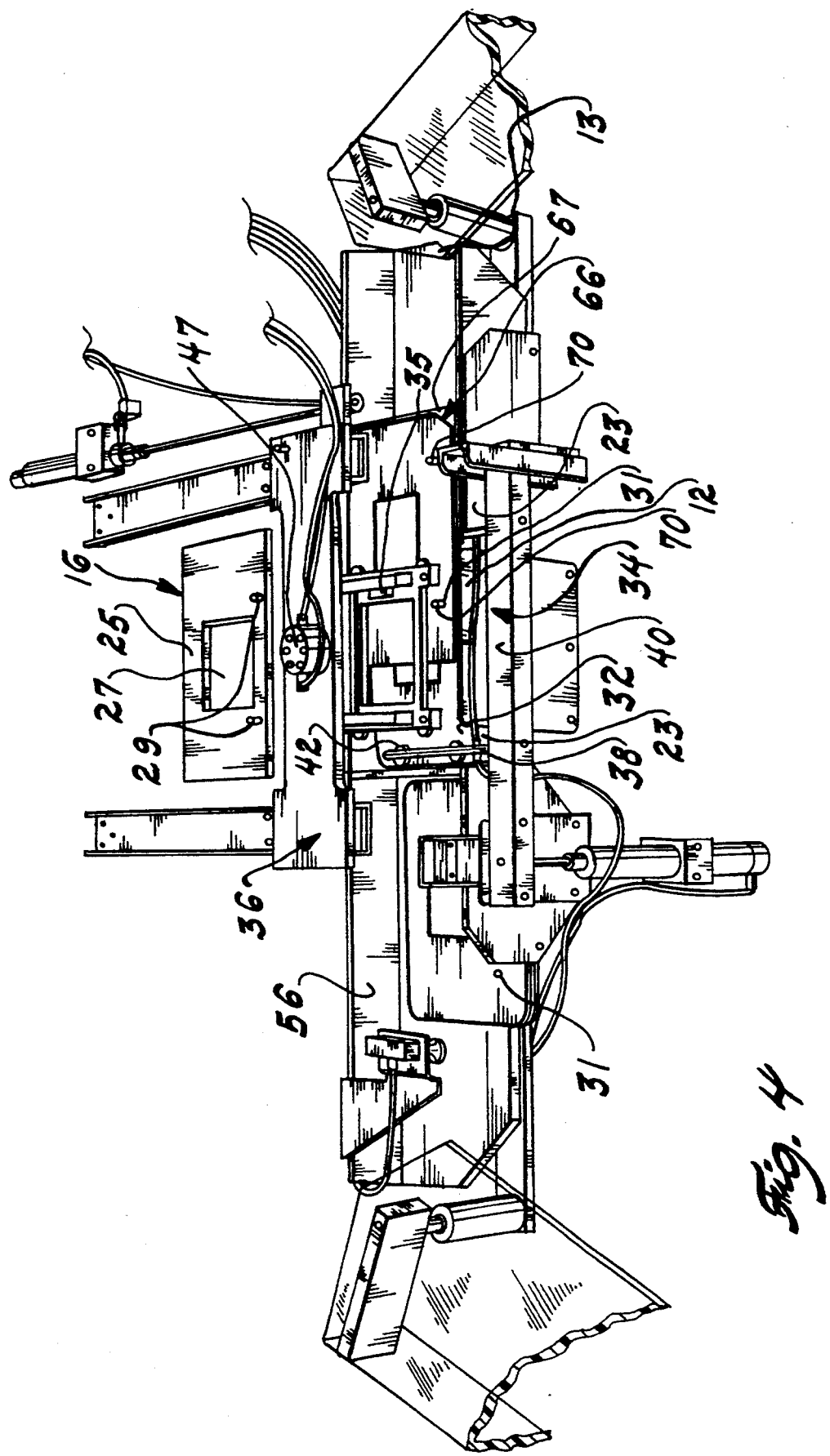
FIG. 4 is a perspective front view of the invention device showing the second vacuum member disposed proximate the storage bin.

With reference also to FIGS. 3 to 5, a central storage bin 32 holds a plurality of carrying cards 12 for processing prior to being transported to the optical stage 16 of the printer 18. To transport a carrying card 12 to the optical stage of the printer, a first vacuum member 34 releasably engages one of the carrying cards 12 in the storage bin 32 and vertically raises the selected carrying card 12 to a predetermined intermediate location above the storage bin 32. A second vacuum member 36 releasably engages the carrying card 12 supported by the first vacuum member 34 at the predetermined intermediate location above the storage bin 32 and transports the carrying card 12 to the optical stage 16 of the photographic printer 18.

More specifically, the first vacuum member 34 is disposed generally over the storage bin 32 and includes a pair of spaced, substantially horizontally extending vacuum arms 38 and a moveable brace member 40. The pair of spaced, substantially horizontally extending vacuum arms 38 are secured to the moveable brace member 40 so as to extend substantially parallel to one another over the storage bin 32. In the preferred embodiment, the outer wall of the storage bin 32 is formed of sections so as to include slots 23 allowing the arms 38 to access the entire depth of the storage bin 32. Each arm 38 includes a pair of vacuum suction cups 42 oriented to face the storage bin 32 so as to provide a plurality of suction points on each arm 38 to removeably engage the carrying cards. The pair of vacuum cups 42 on each arm 38 provide a plurality of vacuum points to prevent the carrying card from rotating while supported by the vacuum member 34.

The brace member 40 includes a pair of linear bearings 41 which slideably engage a pair of substantially vertically extending track sections 44. A pneumatic actuator 46 connected to the brace member 40 moves the brace member 40 vertically along the track sections 44 between a point at the bottom of the storage bin 32 and a point at or above the level of the optical stage 16 so as to raise and lower the arms 38 into and out of the storage bin 32.

Preferably, the second vacuum member 36 includes a separate pneumatic actuator 47, a pair of spaced, substantially horizontally extending vacuum arms 48, and a moveable brace member 50. The brace member includes a pair of linear bearings 49 adapted to slideably engage a pair of substantially horizontally extending track sections 52. The track sections are disposed in a plane at or slightly above the level of the optical stage 16 and a pneumatic actuator 54 connected between one track section 52 and the brace member 50 controls the movement of the brace member 50 along the track sections 52. In this manner, the arms 48 extend over the optical stage 16 when the brace 50 is disposed at one end of its range of motion along the tracks 52 and over the predetermined intermediate position at the other end of its range of motion along the tracks 52.

The pair of spaced, substantially horizontally extending vacuum arms 48 are moveably secured to the moveable brace member 50 through the pneumatic actuator 47 so as to extend from one side thereof. In this manner, the pair of vacuum arms 48 are indexable between raised and lowered positions by operation of the pneumatic actuator 47. The arms 48 are indexable between a raised position for clearance while moving along tracks 52 and a lowered position at the optical stage 16 and intermediate position to precisely position the carrying card at these end positions.

With reference specifically to FIG. 4, the optical stage 16 includes a platen 25 defining an exposure window 27. A plurality of upwardly extending pins 29 which dimensionally correspond to registration holes 31 in the carrying cards 12 are secured to the platen. The carrying cards are transported to the optical stage 16 by the second vacuum member 36 and are aligned precisely on the optical stage when the pneumatic operating device 49 indexes the arms 48 to the lower position so as to allow the carrying card 12 to seat on the pins 29.

The second vacuum member 36 may include a bar code reader 35 connected to the control system to decode information and instructions concerning a specific negative found in the bar code 33 on the carrying cards 12. This information can be used in processing the negatives 14 in the printer 18.

In the preferred embodiment, the pair of substantially horizontally extending track sections 52 are mounted on a rotatable base operative to allow the second vacuum member 36 to rotate as a unit in a substantially horizontal plane about the optical stage 16. This allows for the negatives to be exposed by the printer in either "landscape" or "portrait" format.

A discharge bin 56 is disposed proximate the left side of central storage bin 32 and is operative to store a plurality of carrying cards after being processed by the printer 18. A third vacuum member 58 releasably engages a carrying card 12 disposed at the predetermined intermediate location and transports the carrying card 12 to the discharge bin 56.

With reference specifically to FIG. 5, the third member 58 is adapted to releasably engage a carrying card 12 disposed at the predetermined intermediate location and deposit the carrying card 12 in the discharge bin 56 for subsequent removal. The third vacuum member 58 includes an air plenum 62 and a pair of suction cups 64 operative to engage a carrying card at a plurality of vacuum points to overcome the tendency for spinning of the carrying card associated with a single vacuum contact point. The third vacuum member 58 slides substantially horizontally along a linear cam 65 disposed behind the storage bin 32 and discharge bin 56. An internal magnetic piston 61 and pneumatic cylinder 63 within the guide rod 60 moves the third vacuum member along the linear cam 65 until signaled by microswitch 59 to stop. A guide rod 60 maintains the orientation of the third member 58 on the linear cam 65 without interfering with the vertical positioning of third member 58 by operating the cam 65. The linear cam 65 includes a depression 67 proximate the inner end to allow the third member 58 to move generally above the plane of a carrying card disposed at the intermediate position and then to drop slightly at the intermediate position to engage the selected carrying card without using a separate activator as does the second vacuum member 36.

A secondary carrying card transport assembly 66 is disposed proximate the secondary bin 69 adjacent the right side of the central storage bin 32 and is adapted to transport at least one additional carrying card having a secondary photographic negative mounted thereon to the intermediate predetermined location. The secondary carrying card transport assembly 66 includes a plate member 67 adapted to slideably engage another guide rod 68 disposed on the base plate 13 behind the bins. The plate member 67 includes upwardly projecting pins 70 which dimensionally correspond to the pins 29 associated with the optical stage 16. One or more secondary cards may be placed on the plate 67. These pins 70 are thus adapted to precisely position the card or cards on the plate member 67 using the existing registration holes 31 therein. The secondary assembly is similarly controlled by an internal magnetic piston 71 and pneumatic cylinder 75 with inward movement of the assembly 66 being limited by a suitably placed microswitch 75. Thus, the assembly 66 is adapted to move between the predetermined intermediate location and the secondary bin so as to provide at least one secondary card for use in the printer when required.

For the protection of both the operator and the negatives attached to the carrying cards 12 in the storage bin 32, a pair of clear acrylic covers 17A,17B are pivotably mounted to cover the device 10 during operation thereof. Cross-beams 19A,19B are secured at the outer edges of the covers 17A,17B and pivotably engage pivot members 21A,21B so as to allow the outward rotation of the covers 17A,17B (as shown in FIG. 3) when necessary to gain access to the internal features of the device, such as when loading or unloading carrying cards 12.

OPERATION

In operation, a stack of unprocessed negatives 14 mounted on carrying cards 12 are manually placed in the storage bin 32. The first vacuum member 32 engages and vertically transports the topmost carrying card 12 from the storage bin 32 to the predetermined intermediate position. The second vacuum member 36 moves into position over the intermediate position so as to position arms 48 of the second member between arms 38 of the first member. Arms 48 lower by operation of the actuator 47 and engage the selected carrying card 12. The first vacuum arm 32 is thereafter free to release the selected card. The arms of the second vacuum member 36 thereafter raise by reverse action of the actuator 47 and the second member 36 transports the selected card to and deposits the card on the optical stage 16 of the printer 18. The selected card is aligned by indexing the arms 48 downward so that the upwardly projecting pins 29 engage registration holes 31 and the the card is clamped in place between the arms 48 and the optical stage in preparation for photographic processing. The printer operations can be automated by providing information on each carrying card in a machine readable format, such as bar codes 33, which corresponds to related processing information and instructions.

After the processing has been completed, the second vacuum member 36 transports the carrying card back to the intermediate position in reverse progression. The third vacuum member 58 engages the carrying card at a point outside of the arms 48, the second member 36 releases the card, and the third member 58 moves to a position above the discharge bin 56. At that point, the third member 58 disengages to release the card into the discharge bin 56.

The above process continues through the stack of cards placed in the storage bin 32 until all have been processed and placed in the discharge bin 56. At that point, the cards may be manually removed from the discharge bin for storage, and the device is ready to receive another stack of cards for similar processing.

A variation of the previously described processing routine occurs when a secondary card is required for simultaneous processing in the printer. After a card has been placed on the optical stage, it may be necessary to transport one or more secondary cards to the optical stage as well. For example, a logo may be required on certain photographs. This logo typically would be developed as the only image on a separate negative in a suitable location thereon. When the logo is required, the secondary carrying card transport assembly 66 would transport the additional carrying card to the intermediate predetermined location and the second vacuum member 36 would cycle, without removing the original card from the optical stage, to deliver this additional card to the optical stage. After the exposure, the secondary card would be returned to the secondary carrying card transport assembly 66 and the primary carrying card would be cycled to the discharge bin 56. In this manner, any number of additional images may be superimposed on the finished photograph by transporting additional secondary cards to the intermediate position.

Alternatively, it is possible to intersperse such secondary cards in the stack placed in the storage bin 32 and keep track of their use by having suitable identifying machine readable codes printed thereon. This would allow a logo card to be picked up from the same stack as the primary cards and either reused or discarded with the primary negative holding cards into the discharge bin. For example, by using an appropriate identification scheme and control program, the first logo card encountered in the storage bin 32 may be used and then positioned on the secondary card assembly for later use. This logo card would then be utilized until another logo card was encountered to take its place. At that point, the first logo card could be transported to the discharge bin and the subsequent logo card utilized in like fashion. Numerous deviations of this pattern are readily apparent, such as using multiple logo cards in combination for exposure with a negative. Such derivations would be controlled by a suitable control program which operates the equipment to store the various cards at known locations, such as storage bin 32 or assembly 66, for later use until each such logo card is no longer needed and accordingly discarded into the discharge bin.

From the foregoing description of the preferred embodiment it can be seen that various alternative embodiments of the invention can be envisioned without departure from the scope of the invention as defined in the following claims. Examples of such alternatives include a secondary card carrying bin adapted to store a larger plurality of cards as does the storage bin, etc.

I now claim:

1. A method of transporting carrying cards having photographic negatives mounted thereon between a card supply location, a discharge location, and the optical stage of an item of photographic equipment, characterized in that:

a shuttle is provided which is mounted for movement from the optical stage to an intermediate location spaced from the card supply and discharge locations and each card is transported from the supply location to the intermediate location where it is received by the shuttle whereafter the shuttle moves the card to the optical stage for processing by the photographic equipment whereafter the card is moved by the shuttle back to the intermediate location whereafter the card is moved from the intermediate location to the discharge location.

2. A method according to claim 1 wherein:
   the item of photographic equipment is a printer, the cards carry bar code information, and the shuttle includes a bar code reader operative to read the bar codes on the cards and appropriately control the printer.

3. A method according to claim 1, wherein the method includes the further steps of:
   providing a graphic overlay location spaced from the supply, discharge, and intermediate locations and, for at least some of the cards, and following the movement of the card to the optical stage by the shuttle, transporting a graphic overlay from the graphic overlay location to the optical stage where the overlay is positioned in stacked relation to the card.

4. A method according to claim 3, wherein the method includes the further steps of:
   after the card has been processed at the optical stage with the graphic overlay positioned thereover, moving the graphic overlay to the graphic overlay location, and thereafter moving the card to the discharge location.

5. An apparatus for transporting carrying cards having photographic negatives mounted thereon to and from the optical stage of a item of photographic equipment, said apparatus including:
   a card supply bin;
   a discharge bin;
   a shuttle mounted for movement from the optical stage to an intermediate location spaced from the card supply bin and the discharge bin;
   first transport means for moving each card from the supply bin to the intermediate location for receipt by the shuttle so that the shuttle may move the card to the optical stage for processing by the photographic equipment whereafter the card may be moved by the shuttle back to the intermediate location; and
   second transport means for moving the card from the intermediate location to the discharge bin.

6. An apparatus according to claim 5 wherein:
   the item of photographic equipment is a printer and the apparatus is readily detachably connected to the printer.

7. An apparatus according to claim 5 wherein the apparatus further includes:
   a graphic overlay bin spaced from the supply bin, the discharge bin, and the intermediate location; and
   third transport means operative to move a graphic overlay from the graphic overlay bin to the optical stage and position the overlay in stacked relation to the card.

8. An apparatus according to claim 5 wherein:
   the apparatus further includes a bar code reader operative to read bar code information provided on the cards to appropriately control the photographic printer.

9. An apparatus according to claim 8 wherein:
   the bar code reader is provided on the shuttle.

* * * * *